US007930496B2

(12) United States Patent
Kubo et al.

(10) Patent No.: US 7,930,496 B2
(45) Date of Patent: Apr. 19, 2011

(54) PROCESSING A READ REQUEST TO A LOGICAL VOLUME WHILE RELOCATING A LOGICAL VOLUME FROM A FIRST STORAGE LOCATION TO A SECOND STORAGE LOCATION USING A COPY RELATIONSHIP

(75) Inventors: Robert A. Kubo, Tucson, AZ (US); Matthew J. Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 11/427,732

(22) Filed: Jun. 29, 2006

(65) Prior Publication Data

US 2008/0052478 A1 Feb. 28, 2008

(51) Int. Cl.
*G06F 12/00* (2006.01)
*G06F 13/00* (2006.01)
*G06F 13/28* (2006.01)

(52) U.S. Cl. ....................................................... 711/162
(58) Field of Classification Search .................... 711/162
See application file for complete search history.

(56) References Cited

U.S. PATENT DOCUMENTS

| 5,680,640 | A * | 10/1997 | Ofek et al. ................. 710/19 |
| 6,557,089 | B1 | 4/2003 | Reed et al. |
| 6,618,794 | B1 | 9/2003 | Sicola et al. |
| 6,708,265 | B1 | 3/2004 | Black |
| 6,732,244 | B2 | 5/2004 | Ashton et al. |
| 6,799,258 | B1 * | 9/2004 | Linde ........................... 711/162 |
| 6,832,289 | B2 | 12/2004 | Johnson |
| 2002/0112022 | A1 | 8/2002 | Kazar et al. |
| 2004/0039891 | A1 | 2/2004 | Leung et al. |
| 2004/0107176 | A1 | 6/2004 | Fuente et al. |
| 2004/0215878 | A1 | 10/2004 | Takata et al. |
| 2004/0250021 | A1 | 12/2004 | Honda et al. |
| 2004/0250022 | A1 | 12/2004 | Jarvis et al. |

(Continued)

OTHER PUBLICATIONS

US Patent Application entitled "Updating Metadata in a Logical Volume Associated with a Storage Controller", filed Jun. 28, 2002, Serial No. not yet assigned, by inventors M.J. Kalos and R.A. Kubo.

(Continued)

*Primary Examiner* — Jared I Rutz
*Assistant Examiner* — Chad L Davidson
(74) *Attorney, Agent, or Firm* — David W. Victor; Konrad Raynes & Victor LLP

(57) ABSTRACT

Provided are a method, system, and article of manufacture for relocating a logical volume from a first storage location to a second storage location using a copy relationship. An operation is initiated to move a logical volume from a first storage location to a second storage location. A relationship is established between the first and second storage locations to copy data in the logical volume from the first storage location to the second storage location. A read request is received to data in the logical volume while copying the data in the logical volume from the first storage location to the second storage location. A determination is made, in response to the read request, whether the requested data is at a first copy of the logical volume in the first storage location or a second copy of the logical volume at the second storage location. The requested data is returned from the determined first or second copy of the logical volume while the logical volume is being copied from the first storage location to the second storage location.

21 Claims, 4 Drawing Sheets

U.S. PATENT DOCUMENTS

| | | |
|---|---|---|
| 2004/0260735 A1 | 12/2004 | Martinez et al. |
| 2004/0267706 A1 | 12/2004 | Springer, Sr. et al. |
| 2005/0033748 A1 | 2/2005 | Kazar et al. |
| 2005/0050110 A1* | 3/2005 | Sawdon et al. ............... 707/201 |
| 2005/0076070 A1 | 4/2005 | Mikami |
| 2005/0108263 A1 | 5/2005 | Cabrera et al. |
| 2006/0107010 A1* | 5/2006 | Hirezaki et al. ............ 711/165 |
| 2006/0218203 A1 | 9/2006 | Yamato et al. |
| 2007/0101082 A1* | 5/2007 | Sugiura et al. ................ 711/165 |

OTHER PUBLICATIONS

Letter regarding Art Cited in Counterpart Chinese Patent Application, dated Oct. 10, 2008, 1 p.

* cited by examiner

Copy Relationship

PROCESSING A READ REQUEST TO A LOGICAL VOLUME WHILE RELOCATING A LOGICAL VOLUME FROM A FIRST STORAGE LOCATION TO A SECOND STORAGE LOCATION USING A COPY RELATIONSHIP

BACKGROUND OF THE INVENTION

1. Field of the Invention

The present invention relates to a method, system, and program for relocating a logical volume from a first storage location to a second storage location using a copy relationship.

2. Description of the Related Art

In a network computing environment, host systems may communicate Input/Output ("I/O") requests to a storage controller that manages access to storage systems having the underlying data subject to the I/O request. The storage controller may configure the storage space into logical volumes, such as Logical Unit Numbers (LUNs), partitions, etc., that are presented to the host systems to use. The hosts then direct I/O requests to addressable locations in the logical volumes. The storage controllers execute the I/O requests against the addressable locations in the storage for the hosts. Users of enterprise level storage controllers, also known as enterprise storage servers, expect high availability and continuous access to the data managed by the enterprise server.

During operations, the systems administrator may desire to move a logical volume from one storage location to another for performance or space reasons. For instance, to balance I/O access among different storage locations, the system administrator may want to move a logical volume from a frequently accessed storage area to another storage area experiencing less I/O traffic. Additionally, the administrator may want to disperse logical volumes among different storage devices to minimize the impact of a storage device failure.

In many systems, host I/O access to a logical volume is delayed until the logical volume is relocated and available at the new storage location.

There is a need in the art for improved techniques for relocating a logical volume to a new storage location.

SUMMARY

Provided are a method, system, and article of manufacture for relocating a logical volume from a first storage location to a second storage location using a copy relationship. An operation is initiated to move a logical volume from a first storage location to a secured storage location. A relationship is established between the first and second storage locations to copy data in the logical volume from the first storage location to the second storage location. A read request is received to data in the logical volume while copying the data in the logical volume from the first storage location to the second storage location. A determination is made, in response to the read request, whether the requested data is at a first copy of the logical volume in the first storage location or a second copy of the logical volume at the second storage location. The requested data is returned from the determined first or second copy of the logical volume while the logical volume is being copied from the first storage location to the second storage location.

DETAILED DESCRIPTION

Figure 1:
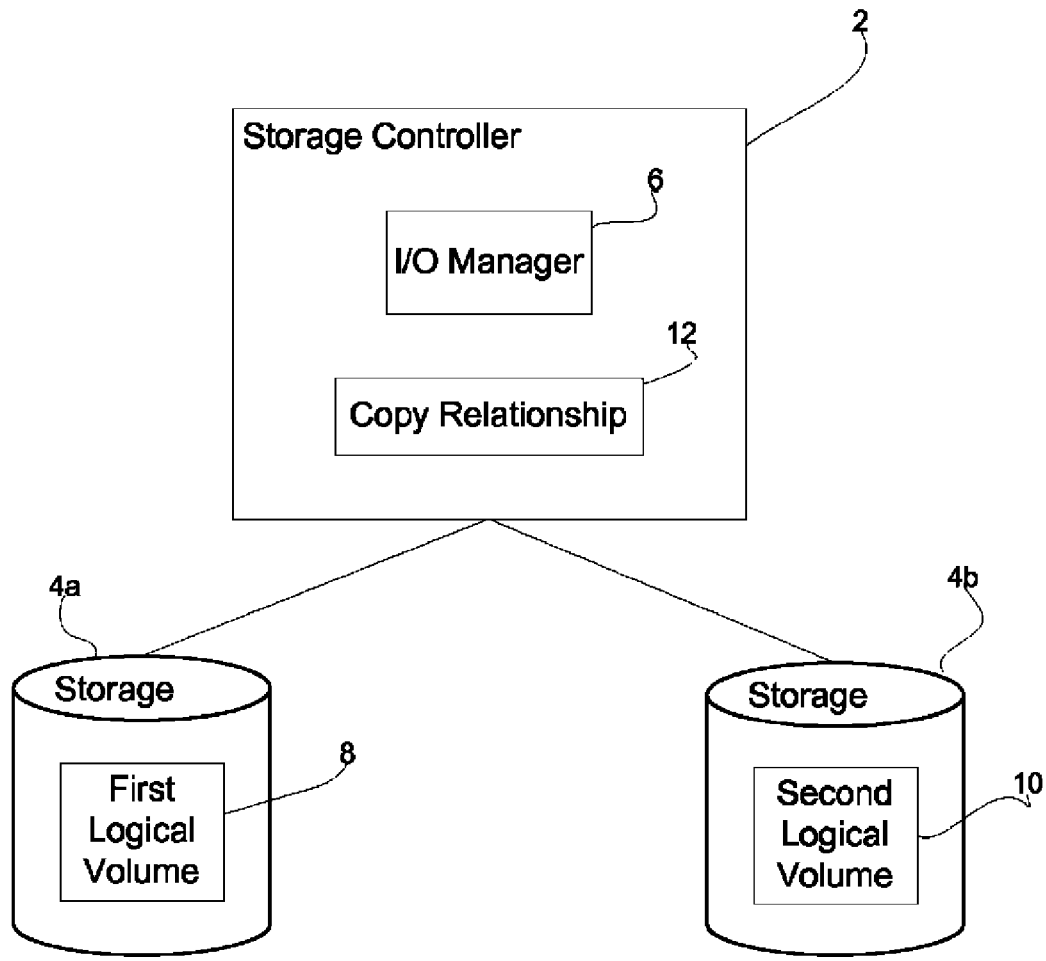
FIG. 1 illustrates an embodiment of a computing environment.

FIG. 1 illustrates an embodiment of a computing environment. A plurality of hosts (not shown) may submit Input/Output (I/O) requests to a storage controller 2 that manages access to data in storages 4a, 4b. The storage controller 2 includes an I/O manager 6 that has code executed to manage I/O operations with respect to the storages 4a, 4b. Each storage 4a, 4b is configured with one or more logical volumes, e.g., Logical Unit Numbers (LUNs), logical devices, logical partitions, logical drives, virtual disks, etc. To relocate a logical volume 8 at a storage 4a to another logical volume 10 in another storage 4b, the I/O manager 6 establishes a copy relationship 12 between a first (or source) logical volume 8 subject to the relocation to a second (i.e., target) logical volume 10 to which the logical volume 8 is being relocated. The copy operation to copy the logical volume may comprise a point-in-time copy operation, such as the International Business Machines Corp. ("IBM") FlashCopy® operation. (IBM and FLASHCOPY are registered trademarks of IBM). A copy relationship 12 comprises pairs of source data and target data, such that after the copy relationship is established for a source and target data pair, the source data is copied to the target data to provide a point-in-time copy of the source data. The data subject to the copy relationship may comprise an extent of multiple sequential tracks or a single track (or fixed block). The source and target data may be located in one or more volumes configured in the storages 4a, 4b. In alternative embodiments, different types of copy operations may be used to copy the logical volume 8 to logical volume 10.

The storage controller 2 may comprise a storage controller or server known in the art, such as the International Business Machines (IBM) Enterprise Storage Server (ESS)® (Enterprise Storage Server is a registered trademark of IBM). Alternatively, the storage controller may comprise a lower-end storage server as opposed to a high-end enterprise storage server. The storages 4a, 4b may comprise separate storage devices, such as an array of storage devices, Just a Bunch of Disks (JBOD), Direct Access Storage Device (DASD), Redundant Array of Independent Disks (RAID) array, virtualization device, tape storage, flash memory, etc. Alternatively, the storages 4a, 4b may comprise portions of a single storage device.

In a further embodiment, the storages 4a, 4b may be connected to different storage controllers that communicate over a network. In a further embodiment, one storage controller and storage may comprise a primary storage controller and primary storage whose data is source data copied to a secondary storage controller to store in target data in a secondary storage. In such primary and secondary site embodiments, an I/O manager on the primary controller or a separate data mover system may manage the copying of target data to source data between the primary and secondary sites.

Figure 2:
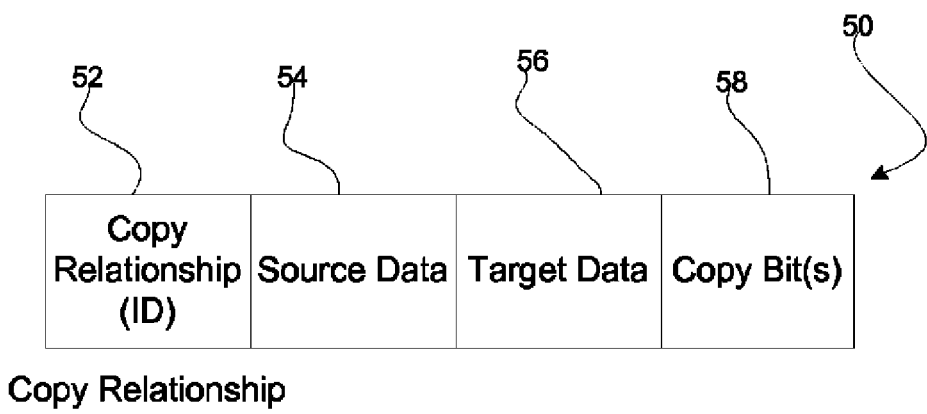
FIG. 2 illustrates information for a copy relationship.

FIG. 2 illustrates an embodiment of copy relationship information 50 for one copy relationship, such as copy relationship 12, including a copy relationship identifier 52; the source data 54 of the first logical volume 8 and target data 56 of the second logical volume 10 subject to the relationship and a copy bit 58 for each data unit, such as a track, fixed block, extent of tracks or blocks, etc., subject to the copy relationship to copy the logical volume 8 to relocated logical volume 10.

Figure 3:
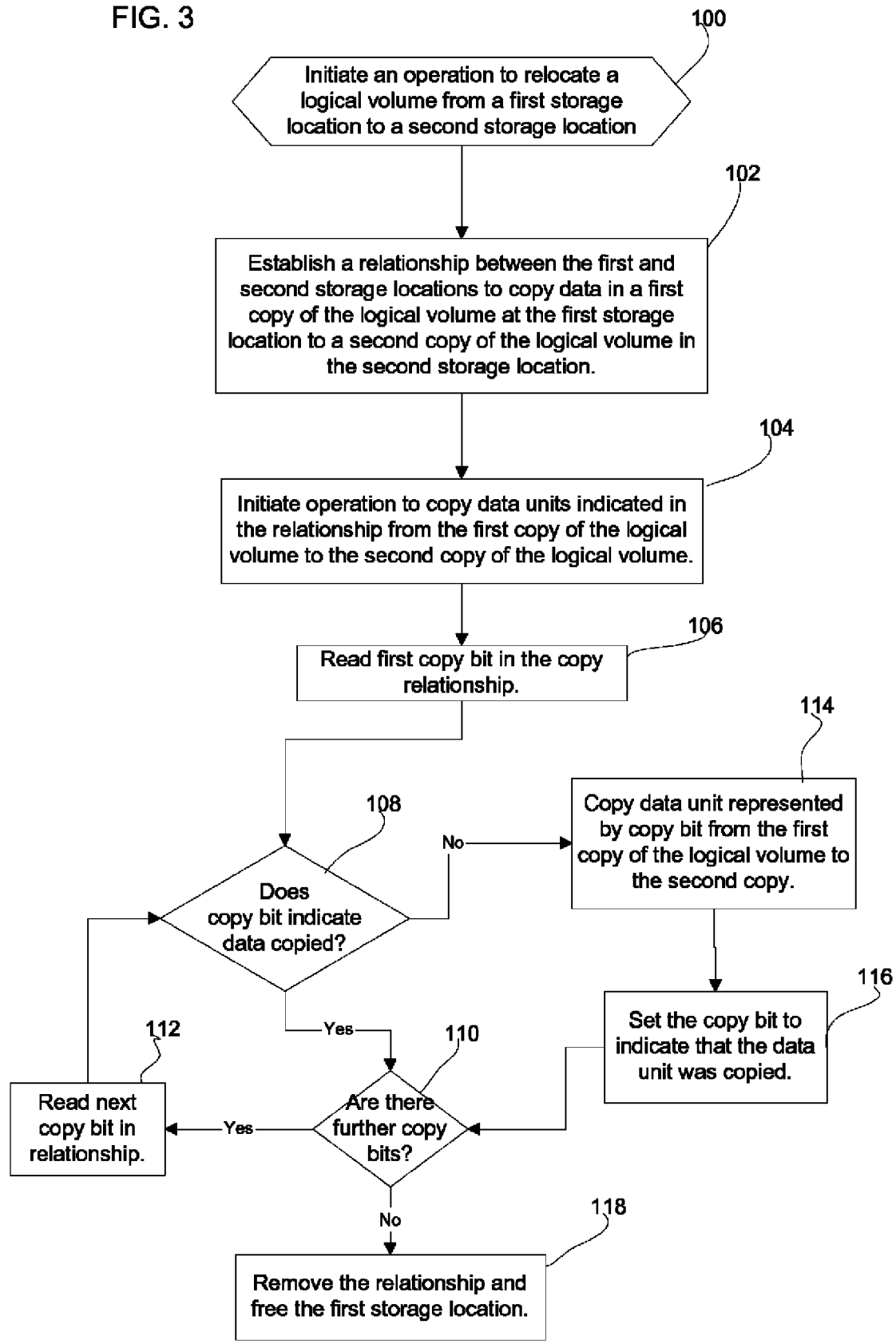
FIG. 3 illustrates an embodiment of operations to initiate an operation to relocate a logical device to another location.

FIG. 3 illustrates an embodiment of operations implemented in the I/O manager 6 to initiate the relocation of logical volume 8 to a new copy of logical volume 10. The operations of FIG. 3 may be initiated by a system administrator who decides that the storage 4b is more suitable for the logical volume 8 than storage 4a. Upon initiating (at block 100) the operation to relocate logical volume 8 from a first storage location 4a to a second storage location 4b, the I/O manager 6 establishes (at block 102) a copy relationship 12 between the first 4a and second 4b storage locations to copy the data in a first (or the initial) copy of the logical volume 8 to a second (relocated) copy of the logical volume 10 in the second 8 storage location. The I/O manager 6 initiates (at block 104) an operation to copy data units indicated in the relationship 12 from the initial logical volume 8 to the relocated copy of the logical volume 10. The I/O manager 6 may process the copy bits 58 to copy data units from the logical volume 8 to logical volume 10. The I/O manager may copy data sequentially to the logical volume 10. The I/O manager 6 starts by reading (at block 106) the first copy bit 58. If (at block 108) the read copy bit 58 indicates that the data unit has been copied and if (at block 110) there are further copy bit 58 to consider, then the I/O manager 6 reads (at block 112) the next copy bit 58, corresponding to the next data unit to copy, and returns to block 108 to determine whether to copy the data unit corresponding to the read copy bit. If (at block 108) the read copy bit 58 indicates that the corresponding data unit has not been copied, then the I/O manager 6 copies (at block 114) the data unit represented by the copy bit 58 from the first copy of the logical volume 8 to the second copy 10 and sets (at block 116) the copy bit 58 to indicate that the data was copied.

From block 116, control proceeds to block 110 et seq. to determine whether there are further copy bits 58 to consider. If (at block 110) there are no further copy bit to consider, i.e., all the data units of the source logical volume 8 have been copied to the target, then the I/O manager 6 may remove (at block 118) the copy relationship 12 for the logical volume relocated and free the space in the first storage location 4a for the relocated logical volume 8. In the described embodiment, the I/O manager 6 performed the operations of establishing the relationship 12, initiating the copying of the data units from the source logical volume 8 to the target logical volume 10, and removing the relationship and freeing the storage space. The I/O manager 6 may perform these operations in response to one or more commands to establish a copy relationship to relocate a logical volume. In an alternative embodiment, a system administrator may initiate these operations through commands or a user interface.

In an alternative embodiment, the space for a data unit in the first copy of the logical volume 8 is freed following block 116 after copying the data unit to the second copy of the logical volume 10 instead of freeing the space following block 118 after the entire logical volume is copied. In certain embodiments, a logical volume may be comprised of large subelements. For instance, in certain storage system architectures the logical storage that represents the logical volume is composed of virtualized storage increments or extents. The storage system that is virtualizing the storage may divide a logical storage entity such as a RAID array into a sub-elements of a fixed size. For example a 300 gigabyte (GB) RAID array may be divided into 300 one GB sub-elements. These sub-elements are then used to create logical volumes. For instance, a ten GB logical volume may be created as comprised of ten one GB sub-elements and a logical volume comprises the logical relationship associating the ten one GB sub-elements. In such a virtualization embodiment, after copying all the data units for a one GB subelement per the operations of FIG. 3, then the space used in the storage 4a for the copied one GB subelement in the first logical volume 8 may be freed for further use by the system. In this way, as each subelement of a logical volume is copied, the space in the storage 4a for that sub-element in the first logical volume 8 is freed.

Figure 4:
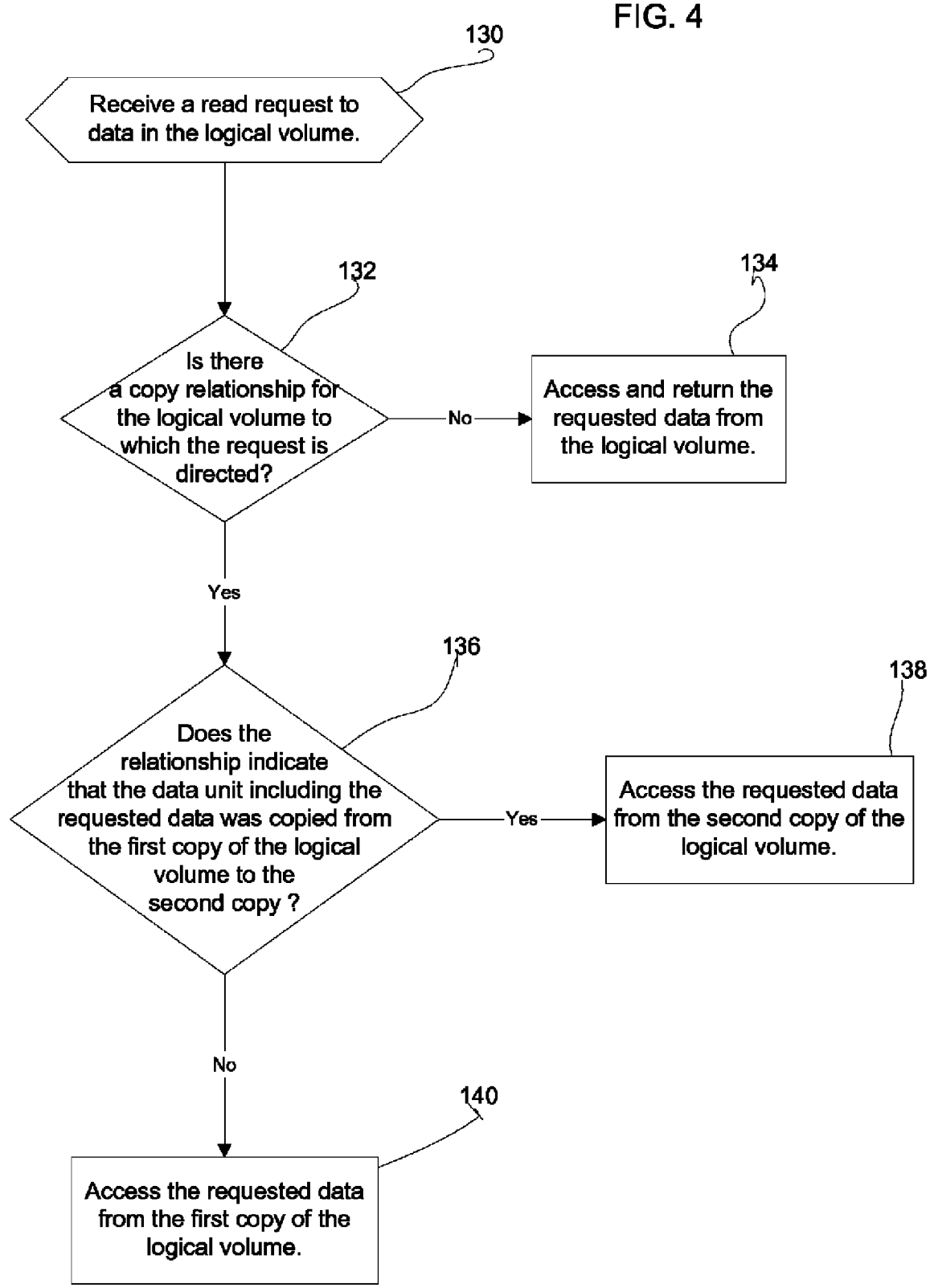
FIG. 4 illustrates an embodiment of operations to process a read request to a logical device subject to a relocation operation.

FIG. 4 illustrates an embodiment of operations performed by the I/O manager 6 to process a read request to data in a logical volume. Upon receiving (at block 130) the read request, if (at block 132) there is no relationship for the logical volume 8 subject to the read request, then the data is accessed (at block 134) from the logical volume to return to the request. If there is no relationship 12, then the logical volume is not subject to an in-progress relocation operation. The I/O manager 6 may determine the presence of a relationship by determining whether the logical volume 8 to which the request is directed is source data 54 (FIG. 2) in a copy relationship 12. Other flags and indicators may be used to signal that a particular logical volume is subject to an active relocation operation. If (at block 132) there is an active copy relationship 12 for the logical volume 8, i.e., the logical volume 8 is subject to an ongoing relocation operation to logical volume 10, then the I/O manager 8 determines (at block 136) whether the relationship 12 indicates that the data unit including the requested data was copied from the first copy of the logical volume 8 to the second copy 10. This determination may be made by checking whether the copy bit 58 (FIG. 2) for the data unit subject to the read request indicates that the requested data unit has been copied to the new copy of the logical volume 10. If (at block 136) the requested data unit was copied, then the I/O manager 6 accesses (at block 138) the requested data from the second copy of the logical volume 10 to return to the request. Otherwise, if (at block 136) the requested data units has not been copied, as indicated by the copy bit 58 for the requested data, then the requested data is accessed from the initial copy of the logical volume 8.

Once the copy bit 58 has been set indicating that the data has been moved to the target volume, all reads should be directed to the target volume because write updates may have been directed to the target volume making source volume data state.

Figure 5:
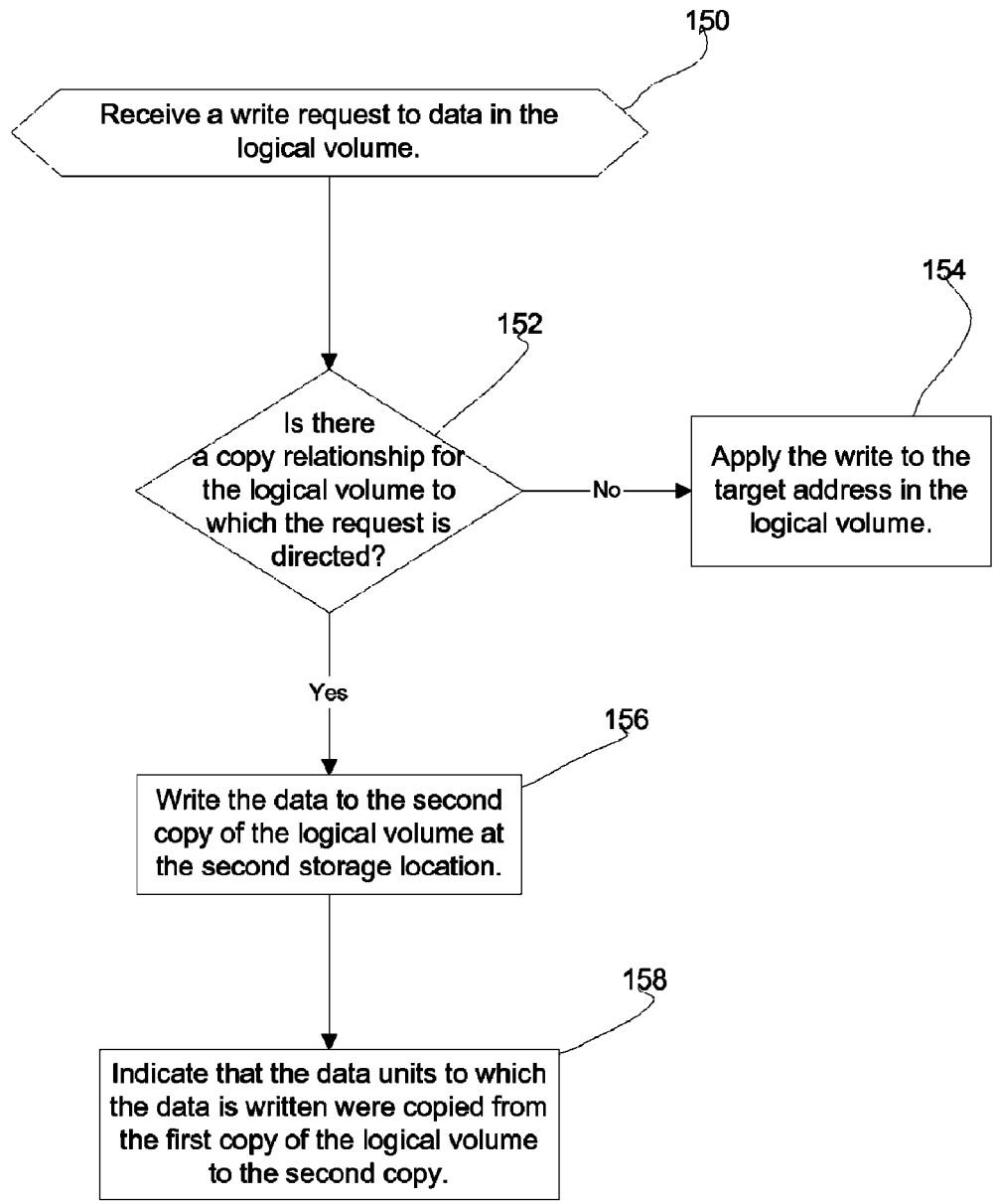
FIG. 5 illustrates an embodiment of operations to process a write request to a logical device subject to a relocation operation.

FIG. 5 illustrates an embodiment of operations performed by the I/O manager 6 to process a write request to one or more data units in a logical volume. Upon receiving (at block 150) the write request, if (at block 152) there is no relationship for the logical volume 8 subject to the write request, then the write is applied (at block 154) to the target address in the logical volume 10. The write may be for less than the data unit size, e.g., track, block, etc. As discussed, the I/O manager 6 may determine the presence of a relationship by determining whether the logical volume 8 to which the request is directed is the source data 54 (FIG. 2) in a copy relationship 12. If (at block 152) there is an active copy relationship 12 for the logical volume 8, i.e., the logical volume 8 is subjected to an ongoing relocation operation to logical volume 10, then the I/O manager 8 writes (at block 156) the data to the relocated copy of the logical volume 10 at the second storage location 4b. The I/O manager 6 indicates (at block 158) that the data units to which the data is written were copied from the first copy 8 of the logical volume to the second copy 10. The I/O manager 6 may indicate that data units of a logical volume 8 subject to a relocation operation were copied or are present in the relocated logical volume 10 by setting the copy bits 58 for those data units that were updated at the new copy of the logical volume 10.

By setting the copy bits 58 to indicate that data units have been copied when the second logical volume 10 is updated with a write, the I/O manager 6 prevents the copy operation initiated at FIG. 3 from copying older data at the logical volume 8 and overwriting the data written to the logical volume 10 as part of a write operation.

In an alternative embodiment of FIG. 5, if there is a copy relationship for the logical volume to which the write is directed, then a check may be made to determine whether the data has been copied from the first logical volume 8 copy to the second logical volume 10 copy. If so, then the write data is written to the second logical volume 10 copy. If the data to update has not been copied, then the data may be written to the first logical volume 8 copy. In this embodiment, the write data will subsequently be copied from the first logical volume 8 to the second logical volume 10 as part of the general copy process of FIG. 3.

In a yet further embodiment of FIG. 5, if there is a copy relationship for the logical volume to which the write is directed, then a check may be made to determine whether the data has been copied from the first logical volume 8 copy to the second logical volume 10 copy by checking the copy relationship 12 copy bit 58 (FIG. 2). If the data unit to update has been copied, then the data is written to the second copy of the logical volume 10. If the data unit to update has not been copied, then the data unit is copied from the first logical volume 8 copy to the second logical volume 10 copy and the copy bit 58 is updated in the copy relationship 12 data structure. The new write data unit is then written to the second logical volume 10.

With the described embodiments, the I/O manager maps read requests to address in a logical volume subject to an ongoing relocation operation either to the initial copy of the logical volume 8 or the new relocated copy 10. The logical volume 8, 10 to which the address is mapped may be determined by the copy relationship 12 information indicating whether the addressed data unit has been copied to the relocated logical volume 10. All read requests for data units that that are indicated by the copy bits 58 to have been copied to the target logical volume 10 are directed to the target logical volume 10.

Described embodiments provide techniques to relocate a logical volume from one storage location to another using a point-in-time copy operation. With described embodiments, I/O requests to the logical volume in progress of being copied to a new logical volume at a different storage location may continue to be received and processed without interruption. The described embodiments map the I/O request to an address at either the initial copy of the logical volume 8 being copied or the relocated logical volume 10 being established by the point-in-time copy operation depending on the status of the copying information with respect to the requested data. In this way, the described embodiments avoid any interruption to I/O access to logical volumes subject to a relocation operation.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate, Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to the configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The concentrated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise in addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specifications, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    initiating an operation to move a logical volume from a first storage location to a second storage location;
    establishing a relationship between the first and second storage locations to copy data in the logical volume from the first storage location to the second storage location to implement the move of the logical volume from the first to the second storage locations;
    receiving a read request to data in the logical volume while moving the data in the logical volume from the first storage location to the second storage location;
    determining, in response to the read request, whether the requested data is at a first copy of the logical volume in the first storage location or a second copy of the logical volume at the second storage location;
    returning the requested data from the determined first or second copy of the logical volume while the logical volume is being copied from the first storage location to the second storage location;
    receiving a request to write data to the logical volume while copying the data in the logical volume from the first copy to the second copy, wherein once the relationship indicates that the requested data has been copied from the first copy of the logical volume to the second copy, all reads to the requested data are directed to the second copy;
    writing the write data to the second copy of the logical volume at the second storage location;
    removing indication of the relationship between the first and second storage locations in response to copying all the data indicated in the relationship from the first storage location to the second storage location resulting in the relocation of the logical volume to the second copy; and
    freeing space in the first storage location for data copied from the first storage location to the second storage location pursuant to the relationship established between the first and second storage locations to relocate the logical volume.

2. The method of claim 1, wherein the logical volume comprises data units, wherein the relationship indicates for data units in the logical volume whether the data unit in the first copy of the logical volume was copied to the second copy of the logical volume, further comprising:
    indicating in the relationship that one data unit including the data subject to the write request has been copied from the first copy of the logical volume to the second copy of the logical volume in response to writing the data received in the write request to the second copy of the logical volume.

3. A method, comprising:
    initiating an operation to move a logical volume from a first storage location to a second storage location to relocate the logical volume to the second storage location;
    establishing a relationship between the first and second storage locations to copy data in the logical volume from the first storage location to the second storage location to implement the move of the logical volume from the first to the second storage locations, wherein the relationship indicates whether data in the first storage location was copied to the second storage location as part of the move operation;
    receiving a read request to data in the logical volume while moving the data in the logical volume from the first storage location to the second storage location;
    determining, in response to the read request, whether the relationship indicates that the requested data has been copied from a first copy of the logical volume in the first storage location to a second copy of the logical volume at the second storage location;
    returning the requested data from the first copy in response to determining that the requested data has not been copied to the second copy;
    returning the requested data from the second copy of the logical volume in response to determining that the requested data has been copied to the second copy, wherein the requested data is returned from the first or second copy while the logical volume is being copied from the first storage location to the second storage location, wherein once the relationship indicates that the requested data has been copied from the first copy of the logical volume to the second copy, all reads to the requested data are directed to the second copy;
    removing indication of the relationship between the first and second storage locations in response to copying all the data indicated in the relationship from the first storage location to the second storage location resulting in the relocation of the logical volume to the second copy; and
    freeing space in the first storage location for data copied from the first storage location to the second storage location pursuant to the relationship established between the first and second storage locations to relocate the logical volume.

4. The method of claim 3, wherein the logical volume comprises data units, wherein the relationship indicates for each data unit in the logical volume whether the data unit in the first copy of the logical volume was copied to the second copy of the logical volume, and wherein determining whether the requested data is maintained at the first or second copy of the logical volume comprises:

determining whether the relationship indicates that the data unit including the requested data was copied from the first copy of the logical volume to the second copy of the logical volume, wherein the requested data is determined to be at the first copy in response to determining that the relationship indicates that the data unit including the requested data was not copied from the first copy to the second copy and wherein the requested data is determined to be at the second copy in response to determining that the relationship indicates that the data unit including the requested data was copied from the first copy to the second copy.

5. The method of claim 3, wherein freeing the space in the first storage location comprises freeing the space used by the data unit copied from the first copy of the logical volume to the second copy of the logical volume in response to completing the copying of the data unit to the second copy of the logical volume and before all the data units for the logical volume are copied to the second copy of the logical volume.

6. The method of claim 3, wherein freeing the space in the first storage location comprises freeing the space used by data units in the first copy of the logical volume in response to completing the copying of all the data units from the first copy of the logical volume to the second copy of the logical volume.

7. The method of claim 3, further comprising:

mapping read requests to addresses of the logical volume to the determined first or second copy of the logical volume while the relationship indicates that data in the logical volume is being copied from the first storage location to the second storage location; and mapping read requests to addresses of the logical volume to the second copy of the logical volume at the second storage location in response to completing the copying of the first copy of the logical volume to the second copy.

8. The method of claim 3, wherein the relationship to relocate the data in the logical volume from the first storage location to the second storage location comprises a point-in-time copy relationship.

9. The method of claim 3, further comprising:

initiating an operation to copy data units of the first copy of the logical volume to corresponding data units of the second copy of the logical volume in response to establishing the copy relationship; and indicating that one data unit has been copied in response to copying the first copy of the logical volume to the second copy of the logical volume, wherein one data unit is determined to be at the first copy of the logical volume if the data unit is indicated as not copied to the second copy of the logical volume, and wherein one data unit is determined to be at the second copy of the logical volume if the data unit is indicated as having been copied to the second copy of the logical volume.

10. A system in communication with a first and second storage locations, comprising:

a processor; and a computer readable storage medium having a program executed by the processor to perform operations, the operations comprising:

initiating an operation to move a logical volume from a first storage location to a second storage location;

establishing a relationship between the first and second storage locations to copy data in the logical volume from the first storage location to the second storage location to implement the move of the logical volume from the first to the second storage locations, wherein the logical volume comprises data units, wherein the relationship indicates for data units in the logical volume whether the data unit in the first storage location of the logical volume was copied to the second storage location of the logical volume;

receiving a read request to data in the logical volume while moving the data in the logical volume from the first storage location to the second storage location;

determining, in response to the read request, whether the requested data is at a first copy of the logical volume in the first storage location or a second copy of the logical volume at the second storage location;

returning the requested data from the determined first or second copy of the logical volume while the logical volume is being copied from the first storage location to the second storage location;

receiving a request to write data to the logical volume while copying the data in the logical volume from the first copy to the second copy, wherein once the relationship indicates that the requested data has been copied from the first copy of the logical volume to the second copy, all reads to the requested data are directed to the second copy;

writing the write data to the second copy of the logical volume at the second storage location;

removing indication of the relationship between the first and second storage locations in response to copying all the data indicated in the relationship from the first storage location to the second storage location resulting in the relocation of the logical volume to the second copy; and freeing space in the first storage location for data copied from the first storage location to the second storage location pursuant to the relationship established between the first and second storage locations to relocate the logical volume.

11. The system of claim 10, wherein the logical volume comprises data units, wherein the relationship indicates for data units in the logical volume whether the data unit in the first copy of the logical volume was copied to the second copy of the logical volume, wherein the operations further comprise:

indicating in the relationship that one data unit including the data subject to the write request has been copied from the first copy of the logical volume to the second copy of the logical volume in response to writing the data received in the write request to the second copy of the logical volume.

12. The system of claim 10, wherein the logical volume comprises data units, wherein the relationship indicates for each data unit in the logical volume whether the data unit in the first copy of the logical volume was copied to the second copy of the logical volume, and wherein determining whether the requested data is maintained at the first or second copy of the logical volume comprises:

determining whether the relationship indicates that the data unit including the requested data was copied from the first copy of the logical volume to the second copy of the logical volume, wherein the requested data is determined to be at the first copy in response to determining that the relationship indicates that the data unit including the requested data was not copied from the first copy to the second copy and wherein the requested data is determined to be at the second copy in response to determining that the relationship indicates that the data unit including the requested data was copied from the first copy to the second copy.

13. The system of claim 10, wherein freeing the space in the first storage location comprises freeing the space used by the data unit copied from the first copy of the logical volume to the second copy of the logical volume in response to completing the copying of the data unit to the second copy of the logical volume and before all the data units for the logical volume are copied to the second copy of the logical volume.

14. The system of claim 10, wherein the operations further comprise:
   mapping read requests to addresses of the logical volume to the determined first or second copy of the logical volume while the relationship indicates that data in the logical volume is being copied from the first storage location to the second storage location; and
   mapping read requests to addresses of the logical volume to the second copy of the logical volume at the second storage location in response to completing the copying of the first copy of the logical volume to the second copy.

15. The system of claim 10, wherein the operations further comprise:
   initiating an operation to copy data units of the first copy of the logical volume to corresponding data units of the second copy of the logical volume in response to establishing the copy relationship; and
   indicating that one data unit has been copied in response to copying the first copy of the logical volume to the second copy of the logical volume, wherein one data unit is determined to be at the first copy of the logical volume if the data unit is indicated as not copied to the second copy of the logical volume, and wherein one data unit is determined to be at the second copy of the logical volume if the data unit is indicated as having been copied to the second copy of the logical volume.

16. An article of manufacture comprising a computer readable storage medium having code executed to perform operations with respect to a first and second storage locations and to perform further operations comprising:
   initiating an operation to move a logical volume from a first storage location to a second storage location;
   establishing a relationship between the first and second storage locations to copy data in the logical volume from the first storage location to the second storage location to implement the move of the logical volume from the first to the second storage locations;
   receiving a read request to data in the logical volume while moving the data in the logical volume from the first storage location to the second storage location;
   determining, in response to the read request, whether the requested data is at a first copy of the logical volume in the first storage location or a second copy of the logical volume at the second storage location;
   returning the requested data from the determined first or second copy of the logical volume while the logical volume is being copied from the first storage location to the second storage location;
   receiving a request to write data to the logical volume while copying the data in the logical volume from the first copy to the second copy, wherein once the relationship indicates that the requested data has been copied from the first copy of the logical volume to the second copy, all reads to the requested data are directed to the second copy;
   writing the write data to the second copy of the logical volume at the second storage location;
   removing indication of the relationship between the first and second storage locations in response to copying all the data indicated in the relationship from the first storage location to the second storage location resulting in the relocation of the logical volume to the second copy; and
   freeing space in the first storage location for data copied from the first storage location to the second storage location pursuant to the relationship established between the first and second storage locations to relocate the logical volume.

17. The article of manufacture of claim 16, wherein the logical volume comprises data units, wherein the relationship indicates for data units in the logical volume whether the data unit in the first copy of the logical volume was copied to the second copy of the logical volume, wherein the operations further comprise:
   indicating in the relationship that one data unit including the data subject to the write request has been copied from the first copy of the logical volume to the second copy of the logical volume in response to writing the data received in the write request to the second copy of the logical volume.

18. The article of manufacuture of claim 16, wherein the logical volume comprises data units, wherein the relationship indicates for each data unit in the logical volume whether the data unit in the first copy of the logical volume was copied to the second copy of the logical volume, and wherein determining whether the requested data is maintained at the first or second copy of the logical volume comprises:
   determining whether the relationship indicates that the data unit including the requested data was copied from the first copy of the logical volume to the second copy of the logical volume, wherein the requested data is determined to be at the first copy in response to determining that the relationship indicates that the data unit including the requested data was not copied from the first copy to the second copy and wherein the requested data is determined to be at the second copy in response to determining that the relationship indicates that the data unit including the requested data was copied from the first copy to the second copy.

19. The article of manufacture of claim 16, wherein freeing the space in the first storage location comprises freeing the space used by the data unit copied from the first copy of the logical volume to the second copy of the logical volume in response to completing the copying of the data unit to the second copy of the logical volume and before all the data units for the logical volume are copied to the second copy of the logical volume.

20. The article of manufacture of claim 16, wherein the operations further comprise:
   mapping read requests to addresses of the logical volume to the determined first or second copy of the logical volume while the relationship indicates that data in the logical volume is being copied from the first storage location to the second storage location; and
   mapping read requests to addresses of the logical volume to the second copy of the logical volume at the second storage location in response to completing the copying of the first copy of the logical volume to the second copy.

21. The article of manufacture of claim 16, wherein the operations further comprise:
- initiating an operation to copy data units of the first copy of the logical volume to corresponding data units of the second copy of the logical volume in response to establishing the copy relationship; and
- indicating that one data unit has been copied in response to copying the first copy of the logical volume to the second copy of the logical volume, wherein one data unit is determined to be at the first copy of the logical volume if the data unit is indicated as not copied to the second copy of the logical volume, and wherein one data unit is determined to be at the second copy of the logical volume if the data unit is indicated as having been copied to the second copy of the logical volume.

* * * * *